United States Patent [19]
Brown

[11] Patent Number: 5,259,670
[45] Date of Patent: Nov. 9, 1993

[54] MIXER AND A METHOD OF MIXER CONTROL

[75] Inventor: Christopher J. Brown, Glossop, England

[73] Assignee: Francis Shaw & Company, England

[21] Appl. No.: 508,062

[22] Filed: Apr. 10, 1990

[30] Foreign Application Priority Data

Apr. 11, 1989 [GB] United Kingdom ............... 8908127

[51] Int. Cl.⁵ .......................... B29B 7/18; B29B 7/28
[52] U.S. Cl. ................................... 366/83; 366/145; 366/97; 425/144; 425/149; 425/171
[58] Field of Search .............. 366/76, 77, 83, 84, 366/85, 142, 151, 156, 169, 79, 140, 97, 195; 425/144, 145, 149, 171

[56] References Cited

U.S. PATENT DOCUMENTS

| | | | |
|---|---|---|---|
| 1,916,300 | 7/1933 | Cleveland . | |
| 3,035,304 | 5/1962 | Reifenhauser | 366/79 |
| 3,360,986 | 1/1968 | Rothschild . | |
| 3,500,496 | 3/1970 | Perlberg . | |
| 3,921,963 | 11/1975 | Neff | 366/79 |
| 3,924,840 | 12/1975 | Nelson, Jr. | 366/79 |
| 3,999,046 | 12/1976 | Porter | 366/77 |
| 4,057,228 | 11/1977 | Volker | 366/79 |
| 4,213,747 | 7/1980 | Friedrich . | |
| 4,249,877 | 2/1981 | Machen | 366/79 |
| 4,265,547 | 5/1981 | Martin | 366/79 |
| 4,309,114 | 1/1982 | Klein | 366/79 |
| 4,310,251 | 1/1982 | Scharer | 366/77 |
| 4,365,946 | 12/1982 | Anders | 366/79 |
| 4,448,736 | 5/1984 | Emery . | |
| 4,455,091 | 6/1984 | Bamberger | 366/77 |
| 4,818,113 | 4/1989 | Patel | 366/76 |
| 4,900,155 | 2/1990 | Schwarz | 366/76 |
| 4,906,102 | 3/1990 | Schwarz | 366/76 |

FOREIGN PATENT DOCUMENTS

| | | |
|---|---|---|
| 0238796 | 1/1987 | European Pat. Off. . |
| 0244121 | 4/1987 | European Pat. Off. . |
| 901309 | 1/1954 | Fed. Rep. of Germany . |

*Primary Examiner*—Harvey C. Hornsby
*Assistant Examiner*—Randall E. Chin
*Attorney, Agent, or Firm*—Salter, Michaelson & Benson

[57] ABSTRACT

In a mixer comprising a body defining a mixing chamber in which two rotors are rotatably mounted, a processability sensing system is disposed in a port in the body. The system is operative to monitor the flow and deformation characteristics of the material being mixed. It is connected to a feedback control loop which leads to a computerised control operative to control mixing characteristics. This enables mixing to be closely controlled to provide a better product.

13 Claims, 2 Drawing Sheets

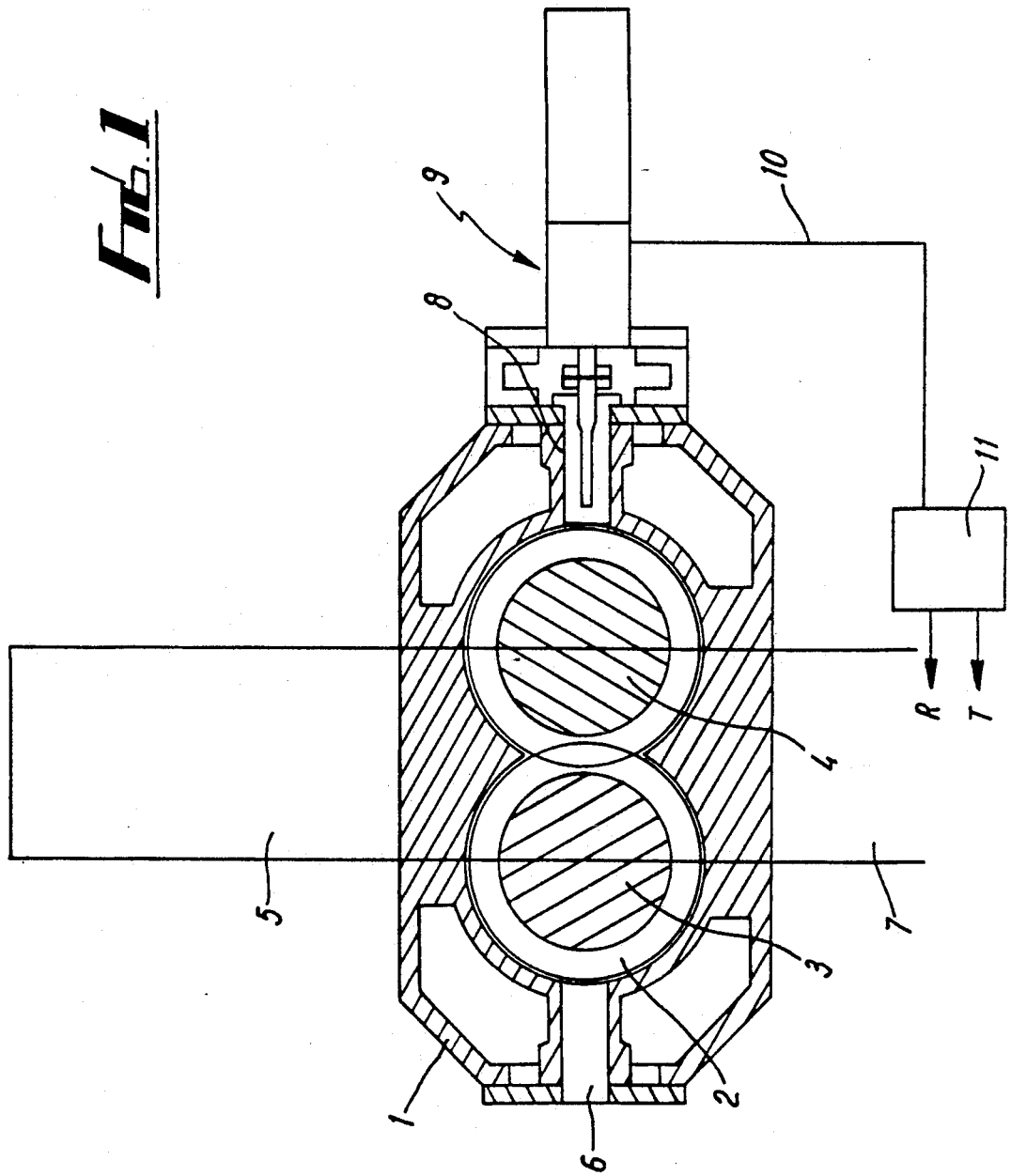

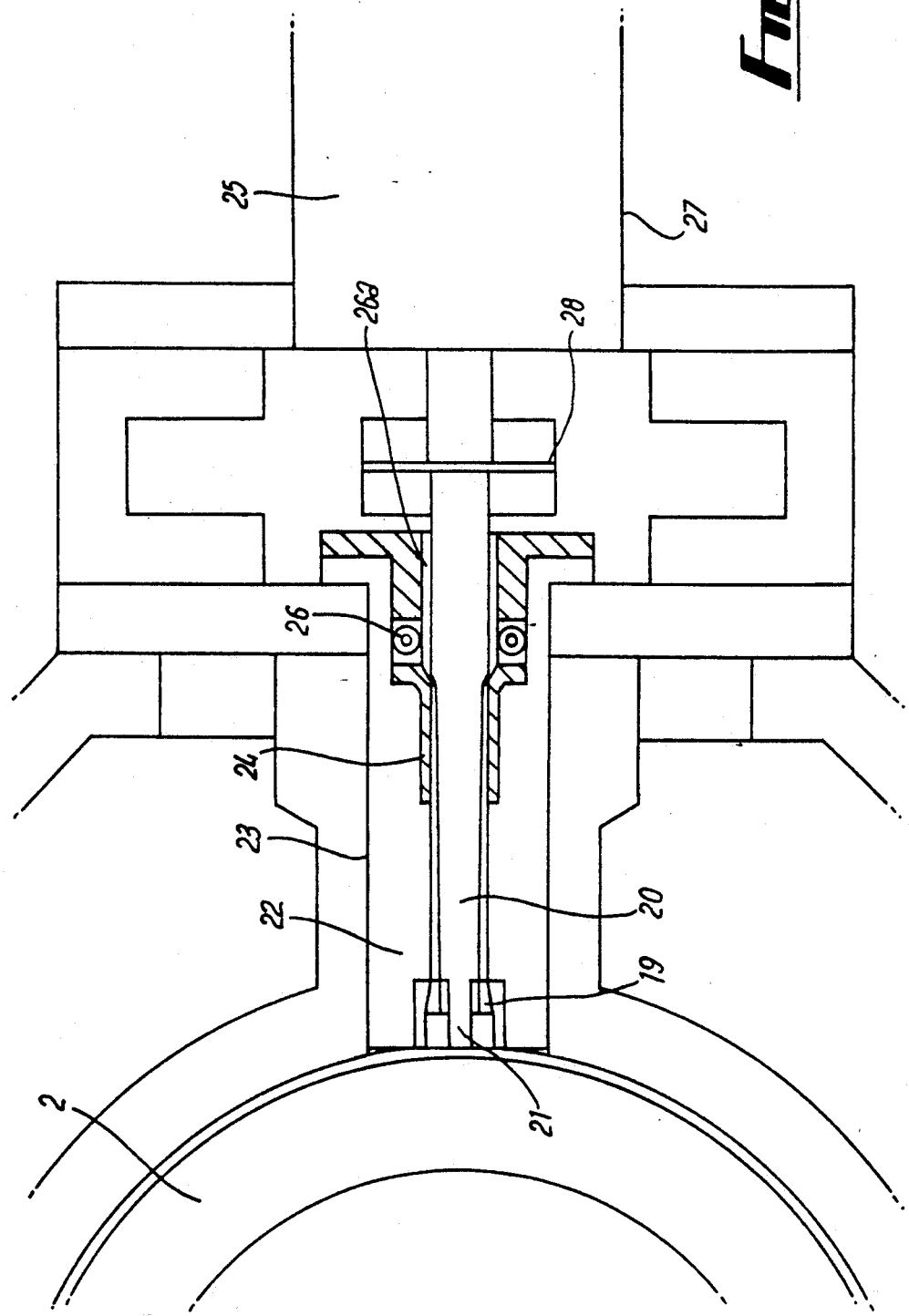

MIXER AND A METHOD OF MIXER CONTROL

The present invention relates to mixers and to a method of controlling mixers.

The internal mixers presently used by the rubber industry are predominantly fixed-speed machines. However, the substantial reduction in the cost of variable speed drives in recent years has resulted in their installation with most recently purchased mixers.

Conventional mixing control techniques are based on providing fixed or known amounts of kinetic and/or thermal energy during mixing. These techniques do not make provision for batch-to-batch variations in the internal energy and the entropy of the incoming material, with the result that any variations in these incoming properties, given that the material is subjected to constant processing conditions, will be reflected as batch-to-batch variations in the outgoing properties. These problems are particularly prevalent when mixing materials such as natural rubber.

The Batch Condition Control (BCC) system has proposed a method of measuring, inter alia, the reaction torque experienced by the rotors of an internal mixer and, in terms of a known relationship between torque and viscosity, assessing the relative rheological state of the compound in real time and adjusting the levels of kinetic and thermal energy inputs in order to achieve a predetermined value of viscosity on discharge.

Certain problems exist with the BCC system, including:

a) the compound does not form a continuum within the mixer and hence the process is inherently chaotic, with the result that the relationship between torque and viscosity cannot be defined with certainty.

b) the method involves the use of rotor torque as a measure of viscosity, viscosity as a measure of rheology, rheology as a measure of processability, and processability as a measure of extrudability; the relationship between rotor torque and extrudability is thus long and inherently inaccurate.

An object of a preferred embodiment of the invention, is to overcome the above problems.

According to one aspect of the present invention there is provided a mixer for mixing viscous materials comprising a housing defining a mixing chamber in which one or more mixing rotors are rotatably mounted, a processability sensor for producing a signal representing the processability of the material being mixed, a feed back control loop connected to the sensor and to a control for controlling kinetic and thermal energy inputs in dependence upon the processability sensed.

According to another aspect of the present invention there is provided a method of mixing in a mixer comprising a rotatable rotor in a mixing chamber including the steps of feeding material to be mixed to the chamber, monitoring the processability of the material being mixed in the chamber by means of a processability sensing unit, producing a signal in dependence upon the processability sensed and employing that signal via a feedback control loop to control the rotor speed, mixing chamber temperature, mixing time and pressure to control the processability of the material being mixed.

In a preferred embodiment of the invention, the mixer comprises two rotors disposed for rotation about horizontal parallel axes. Material to be mixed is fed to the mixing chamber from above and discharged from below the rotors. The processability sensing unit extends through the housing to communicate with the mixing chamber. It comprises means for simulating, any downstream processing operation for which it is desired to mix material and in this example comprises an extruder. The extruder has a screw and prescrew disposed in an extruder barrel. The barrel has an outer fixed housing and an inner free housing. The inner free housing defines an annular recess in which a sensor is disposed. The screw is connected to a drive via a drive coupling. The sensor is connected to a feedback loop which includes a computer which is programmed to control the rotor speed, mixing chamber temperature, ram pressure, time and other mixing characteristics in dependence upon the sensor signals.

In order that the invention may be more clearly understood, one embodiment thereof will now be described, by way of example, with reference to the accompanying drawings, in which:

FIG. 1 shows a diagrammatic cross sectional view of a mixer incorporating a sensing system according to the invention, and FIG. 2 shows a detailed view of the sensing system shown in FIG. 1.

Referring to FIG. 1, the mixer itself is conventional and comprises a mixer body 1 defining a mixing chamber 2 in which two rotors 3 and 4 are mounted for rotation by means of an electric motor (not shown). Material to be mixed is fed to the chamber through a conventional feed arrangement 5 and oil (if required) is fed to the chamber via the port 6. Mixed material is discharged from the mixer through an outlet 7 at the base of the mixer. The mixed material is usually then processed through a mill or a dump extruder prior to a downstream processing apparatus, such as being fed to extruder and the state of "mixedness" of the material should be acceptable to the requirements of the apparatus. It is these requirements which form the theoretical basis for the mixer development of the present invention.

Leading into the mixing chamber 2 on that side of the mixer remote from the oil inlet port 6 is a further port 8. Attached to this port 8 is a processability sensing system 9 operative to monitor the flow and deformation characteristics (extrudability) or calederability or millability or mouldability of the material being mixed. In the instant embodiment, the downstream processing operation is an extrusion operation and therefore the processability sensing system 9 will measure the extrudability of the material being mixed. This is connected to a feedback control loop 10 which leads to a computerised control 11 operative to control rotor speed and mixing chamber temperature characteristics R and T, and ram pressure and time and other mixing characteristics in dependence upon the signal fed from the processability sensing system 8.

Referring additionally to FIG. 2, the processability sensing system comprises a means for simulating a given downstream processing operation and a sensor means for sensing the flow and deformation characteristics of the mixed material as determined by the simulator means. In the instant embodiment, since the downstream processing operation is an extrusion process, the simulator means comprises a pilot extruder and the sensor comprises a torque sensor 26. The extruder comprises an extruder screw and pre-screw 20 and 21 respectively disposed inside an extruder barrel 22 and mounted in a bearing 19. The barrel 22 fits inside the port 8 leading into the mixing chamber 2 so that material from the chamber can enter the pilot extruder. The extruder barrel 22 comprises a fixed housing 23 and a free housing 24. The free housing 24 surrounds the extruder screw towards that end of the screw 20 remote from the mixing chamber 2 but upstream of a die passage 26a and is disposed between the screw 20 and the fixed housing 23. The free housing 24 defines an annular recess 25 in which the torque sensor 26 is disposed. In use, this sensor produces a signal in dependence upon the reaction torque to which the free housing 24 is subjected when driven by drive 27. The system also includes means for producing signals representing temperature, pressure, die swell and other extrusion characteristics. Drive 27 is connected to drive screw 20 through a drive coupling 28.

The torque sensor and other sensor means are connected to the feedback loop 10 and computerised control 11 already mentioned. This control 11 controls the mixing chamber 2 temperature, the speed of the rotors 3 and 4 through a variable speed control, ram pressure, time of mixing and other mixing characteristics in dependence upon the signal fed to it from the sensor. In effect therefore, the mixing characteristics of the material being mixed are directly controlled by the same type of apparatus (an extruder) for which the mixed material is to be handled in a downstream processing operation thus leading to better and more predictable results. By equating the final level of internal energy and entropy directly with the processability/extrudability of the mixed material and mixing according to the latter criterion, any batch-to-batch variations in the initial internal energy levels are automatically compensated for and a uniform level of processability is obtained.

It will be appreciated that the above embodiment has been described by way of example only and that many variations are possible without departing from the invention.

I claim:

1. A batch mixer for mixing raw materials to produce a mixed product, wherein said mixed product is further processed in a downstream processing device after being mixed, said batch mixer comprising:
   a housing defining an interior mixing chamber;
   one or more mixing rotors rotatably mounted in said mixing chamber for rotation at a rotor speed;
   rotor speed control means for controlling the speed of the mixing rotors;
   temperature control means for controlling the temperature of the mixed product;
   a sensor system for sensing a processing characteristic of said mixed product with respect to said downstream processing device comprising
      a pilot processing device which acts as an experimental model for said downstream processing device, said pilot processing device extending into said mixing chamber and removing a portion of said mixed product from said mixing chamber during mixing, said pilot processing device acting on said portion of mixing product and
      sensor means for sensing a predetermined operating characteristic of said pilot processing device as determined by said portion of mixed product, said sensor means producing a signal representing said operating characteristic with regard to said portion of mixed product; and
   feedback control means including a control loop connected to said sensor means, said feedback control means being operative for controlling said rotor speed control means and said temperature control means in response to said signal in order to control kinematic and thermal energy input to said mixed product to alter said processing characteristic of said mixed product.

2. The mixer as claimed in claim 1 comprising two rotors disposed for rotation about parallel axes.

3. The mixer as claimed in claim 1 further comprising feeder means for feeding said raw materials into said mixing chamber from above said mixing chamber.

4. The mixer as claimed in claim 1 further comprising discharge means for discharging said mixed product downwardly from said mixing chamber.

5. The mixer as claimed in claim 1 in which said pilot processing device comprises an extruder extending through said housing to communicate with said interior mixing chamber.

6. The mixer as claimed in claim 5, in which said extruder comprises an extruder barrel and a screw disposed therein.

7. The mixer as claimed in claim 6, in which said extruder barrel comprises an outer fixed housing and an inner rotatable housing.

8. The mixer as claimed in claim 7, in which said inner rotatable housing comprises a bore having a circumferential wall, an annular recess in said circumferential wall, and a torque sensor disposed in said annular recess.

9. The mixer as claimed in claim 6, in which said screw is connected to a drive via a drive coupling.

10. The mixer as claimed in claim 5, in which said extruder comprises one or more extruder passages.

11. The mixer as claimed in claim 1, in which said feedback control means comprises computer control means for controlling said rotor speed control means and said temperature control means in dependence upon said signal from said sensor means.

12. A method of mixing raw materials to produce a mixed product, wherein said mixed product is further processed in a downstream processing device after being mixed, said batch mixer comprising a housing defining a mixing chamber, a rotatable rotor, rotor speed control means, and temperature control means, said method comprising the steps of:
   feeding said raw material into said mixing chamber,
   monitoring a processing characteristic of said mixed product with respect to said downstream processing device in said chamber by means of a sensor system comprising
      a pilot processing device which acts as an experimental model for said downstream processing device, said pilot processing device extending into said mixing chamber and removing a portion of said mixed product from said mixing chamber during mixing, said pilot processing device acting on said portion of mixed product and
      sensor means for sensing a predetermined operating characteristic of said pilot processing device as determined by said portion of mixed product, said sensor means producing a signal representing said operating characteristic with regard to said portion of mixed product; and
   employing said signal via feedback control means to control said rotor speed control means and said temperature control means, thereby controlling the processing characteristic of said mixed product.

13. A batch mixer for mixing raw materials to produce a mixed product, wherein said mixed product is further processed in an extrusion device after being mixed, said batch mixer comprising:
a housing defining an interior mixing chamber;
one or more mixing rotors rotatably mounted in said mixing chamber for rotation at a rotor speed;
rotor speed control means for controlling the speed of the mixing rotors;
temperature control means for controlling the temperature of the mixed product;
a sensor system for sensing a processing characteristic of said mixed product with respect to said extrusion device comprising
   a pilot extruder which acts as an experimental model for said extrusion device, said pilot extruder extending into said mixing chamber and removing a portion of said mixed product from said mixing chamber during mixing, said pilot extruder extruding said portion of mixed product and
torque sensing means for sensing a torque applied to said pilot extruder as determined by said portion of mixed product, said torque sensing means producing a signal representing said operating characteristic with regard to said extrusion device; and
feedback control means including a control loop connected to said torque sensing means, said feedback control means being operative for controlling said rotor speed control means and said temperature control means in response to said signal in order to control kinematic and thermal energy input to said mixed product to alter said processing characteristic of said mixed product.

* * * * *